US007798039B2

(12) United States Patent
Schurch et al.

(10) Patent No.: US 7,798,039 B2
(45) Date of Patent: Sep. 21, 2010

(54) CROSS CUTTING DEVICE AND METHOD FOR OPERATING SUCH A CROSS CUTTING DEVICE

(75) Inventors: Thomas Schurch, Rothrist (CH); Bruno Wallimann, Alpnach (CH)

(73) Assignee: Hunkeler AG, Wikon (CH)

( * ) Notice: Subject to any disclaimer, the term of this patent is extended or adjusted under 35 U.S.C. 154(b) by 686 days.

(21) Appl. No.: 11/723,669

(22) Filed: Mar. 21, 2007

(65) Prior Publication Data

US 2007/0234863 A1 Oct. 11, 2007

(30) Foreign Application Priority Data

Mar. 22, 2006 (EP) .................................. 06005836

(51) Int. Cl.
*B26D 1/00* (2006.01)
*B23D 25/12* (2006.01)

(52) U.S. Cl. ................... 83/13; 83/24; 83/343; 83/346; 83/349; 83/357

(58) Field of Classification Search ................... 83/349, 83/356.1, 357, 13, 24, 37, 329, 335, 343, 83/344, 345, 346, 98, 99, 100
See application file for complete search history.

(56) References Cited

U.S. PATENT DOCUMENTS

| | | | | |
|---|---|---|---|---|
| 4,409,870 | A * | 10/1983 | Rynik et al. | 83/100 |
| 4,480,516 | A | 11/1984 | Leroy | |
| 4,537,588 | A * | 8/1985 | Ehlscheid et al. | 493/342 |
| 4,671,152 | A * | 6/1987 | Blumle | 83/152 |
| 5,127,292 | A | 7/1992 | Kapoor | |
| 5,199,341 | A | 4/1993 | Jones | |
| 5,344,091 | A * | 9/1994 | Molison | 242/527.1 |
| 5,570,620 | A * | 11/1996 | Okonski et al. | 83/152 |
| 5,609,084 | A | 3/1997 | Gronbjerg | |
| 5,782,156 | A | 7/1998 | Collins | |
| 6,030,481 | A | 2/2000 | Winter et al. | |
| 6,076,444 | A * | 6/2000 | Okonski | 83/99 |
| 6,895,845 | B2 | 5/2005 | Snyder | |
| 7,263,921 | B2 * | 9/2007 | Grenier et al. | 83/100 |
| 2005/0188803 | A1 | 9/2005 | Ehret | |

FOREIGN PATENT DOCUMENTS

| | | | |
|---|---|---|---|
| DE | 31 45 912 | A1 | 6/1982 |
| EP | 0 622 320 | A1 | 11/1994 |
| EP | 1 228 995 | A1 | 8/2002 |
| EP | 1 570 960 | A2 | 9/2005 |
| GB | 745878 | | 3/1956 |
| WO | WO 95/01245 | A1 | 1/1995 |
| WO | WO 95/28261 | A1 | 10/1995 |
| WO | WO 2004/110906 | A2 | 12/2004 |

* cited by examiner

*Primary Examiner*—Boyer D Ashley
*Assistant Examiner*—Omar Flores-Sánchez
(74) *Attorney, Agent, or Firm*—Oliff & Berridge, PLC

(57) ABSTRACT

The invention relates to a cross cutting device and a corresponding operating method for manufacturing cut-out portions from a flat material web which is moved in a direction of transportation. The device has two cross cutting units which each have a fixed blade and a rotating blade arranged on a rotational element, and said cross cutting units are spaced apart from one another in the direction of transportation. The second rotational element can be connected to a suction device in such a way that in a case of application the cut-out portion is at least temporarily secured on the second rotational element. According to the invention, the second rotational element has, along its circumferential face, a plurality of zones, to which suction air can be applied individually and/or in combination, in order to secure cut-out portions of different formats.

17 Claims, 14 Drawing Sheets

CROSS CUTTING DEVICE AND METHOD FOR OPERATING SUCH A CROSS CUTTING DEVICE

CROSS-REFERENCE TO RELATED APPLICATION

This application claims priority from European Patent Application No. EP 06 005 836.9, filed Mar. 22, 2006, the entire disclosure of which is incorporated herein by reference thereto.

BACKGROUND

The present invention relates to a cross cutting device and to a method for operating such a cross cutting device.

When individual products, for example individual sheets, are manufactured from an endless flat material web, in particular made of paper, there may be the problem that two successive products cannot be separated from one another by a single cut. This is the case in particular if the position of the edges of a sheet is defined in relation to register marks or water marks and the like. This makes it necessary to cut out portions from the flat material web.

Cross cutting devices having two cross cutting units for manufacturing individual products from a flat material web and for separating cut-out portions from the flat material web or from the product are disclosed, for example, in documents EP-A 0622320, EP-A 1570960, DE-A 3145912, U.S. Pat. No. 5,199,341 and WO-A 95/01245. The cross cutting units each have a fixed blade and a rotating blade arranged on a rotational element, and are spaced apart from one another in the direction of transportation of the flat material web. In a device of the generic type according to EP-A 0622320 or DE-A 3145912 the second rotational element has a zone which can be connected to a suction device and has suction openings and which serves to secure the front edge of the portion to be cut from the flat material web to the second rotational element before the cutting process, and thus to rotate it out of the plane of transportation. The connection to the suction device is interrupted again after the separation of the cut-out portion so that the cut-out portion either drops off under the force of gravity, is scraped off mechanically by the second rotational element or is pushed away with blown air and can be removed. However, the front edge of the following product which is already separated or is still to be separated from the material web should not be deflected out of the plane of transportation but rather be conveyed onward in the direction of transportation. In order to ensure this, suction air is applied to the suction openings in a clocked fashion within a processing cycle.

The processing cycle is understood to mean the processes which lead to the separation of in each case one product and, if appropriate, in each case one cut-out portion, in particular the production of a first separating cut for separating the product and the following material web, and the production of a second separating cut for separating the cut-out portion and the product. The first separating cut is usually carried out by the first cross cutting unit which is located downstream in the direction of transportation, and the second separating cut is carried out by the following, second cross cutting unit. If a cut-out portion is not produced, the second separating cut is dispensed with. Instead of complete separation, it is, for example, also possible to form a perforation.

SUMMARY

A problem with the known cross cutting devices is that the size and position of the suction zone is permanently predefined. In the devices according to EP-A 0622320 and DE-A 3145912, the suction zone is, for example, arranged directly downstream of the rotating blade in the direction of transportation, or in the region of the rotating blade. As a result of this the maximum width of the cut-out portion which can be secured to the rotatable element is determined by the width of the suction zone. In order to be able to hold even relatively large cut-out portions, the suction zone must therefore be relatively wide. As a result of this in turn incorrect air gets into the suction system when cut-out portions which are narrow compared to the width of the suction zone are sucked in. As a result, the suction device is loaded and the suction power is adversely affected to a large degree.

The invention is therefore based on the object of further developing the known cross cutting devices in such a way that the device can easily be adapted to different formats of the cut-out portion without greatly loading the suction device.

The object is achieved by means of a cross cutting device for manufacturing cut-out portions from a flat material web that is moved in a direction of transportation, including a first cross cutting unit for the flat material web, said first cross cutting unit having a first fixed blade and a first rotating blade arranged on a first rotational element, a second cross cutting unit for the flat material web, said second cross cutting unit being spaced apart from said first cross cutting unit in the direction of transportation and having a second fixed blade and a second rotating blade arranged on a second rotational element. The second rotational element can be connected to a suction device such that a cut-out portion is at least temporarily secured on the second rotational element. The second rotational element contains, along a circumferential face, a plurality of zones to which suction air can be applied individually and/or in combination in order to secure cut-out portions of different formats.

The object is also achieved by means of a method for operating a cross cutting device including the steps of selecting the zones of the second rotational element in accordance with a format of the cut-out portion; and correspondingly clearing or interrupting entries to the zones.

Advantageous further developments of the device and of the method are specified in the dependent claims, the description and the drawings.

According to the invention, the second rotational element contains, along its circumferential face, a plurality of zones, to which suction air can be applied individually or in combination, in order to secure cut-out portions of different formats. For this purpose, preferably a plurality of suction chambers which are separated from one another and which are each connected to a suction zone and can be connected to a suction device, for example a vacuum pump, are provided in the interior of the rotational element. In this context, the connection to the suction device for individual chambers or for a combination of chambers can be cleared or interrupted in order to obtain a resulting overall suction zone with a specific shape and size which is adapted to the format of the cut-out portion. The clearing or interruption of the suction air supply is brought about with a control device which closes or opens the entries to the chambers, preferably mechanically. For this purpose, preferably one control element which can move between various positions and which is preferably moved along with the second rotational element is provided. When there is a fixed suction air port, the position of the control element in relation to the rotational element thus determines the application of suction air to the individual chambers and the position of the element relative to the suction air port by supplying suction air within one processing cycle. Through the latter it is possible to ensure that only the front edge of a cut-out portion is sucked in, but not the front edge of the actual product which has to be conveyed onward in the plane of transportation.

The invention therefore advantageously permits suction air to be applied to the suction zone of the second rotational element essentially only over the surface of the cut-out portion. It thus prevents incorrect air getting into the suction system. This is promoted by the connection of the suction zones to the suction air source only at specific times within a processing cycle.

In one advantageous development of the invention, blown air is applied to the suction chambers or suction zones after the separation of the cut-out portion from the material web. As a result the cut-out portion can easily be removed from the second rotational element.

In a further advantageous development of the invention, additional measures ensure that the material web and the product move in the desired way. In this context, blown air is used in addition to the suction air. The measures described below can advantageously also be used in cross cutting devices without a second cross cutting unit, i.e. without the possibility of producing cut-out portions. In this case, the suction air system described above can be dispensed with.

One of these measures consists in providing an additional blowing zone with corresponding blown air supply on the second rotational element. Said blown air supply serves to deflect the front edge of the material web away from the rotational element in the direction of the plane of transportation after the separation of a cut-out portion, in order to facilitate reliable onward transportation in the plane of transportation. If no cut-out portion is produced, the transfer of the front edge to a following transportation device is thus also simplified.

A further one of these measures comprises influencing the movement of the front edge of the material web in the region of the stationary blade of a cross cutting unit by a suitable air supply. Blown air is preferably blown in in the region of the stationary blade in such a way that it runs essentially parallel to the plane of transportation, for example through a blown air duct which is oriented parallel to the plane of transportation. The effect is supported by an impact plate which is oriented parallel to the plane of transportation. The air stream generates a partial vacuum in the plane of transportation, and the front edge and the material web are drawn in the direction of the stationary blade (Venturi effect). At the same time, the product is moved in the direction of transportation by the air stream. This makes it possible to feed the front edge of the material web or of a product which is to be transported onward in the direction of transportation into a following transportation system.

It is particularly preferred if the blown air changes its direction during a processing cycle in order to support the outputting of a cut-out portion. Its direction is therefore preferably changed in such a way that as the cut-out portion to be separated approaches the direction of said blown air points onto the plane of transportation and deflects the front edge of the cut-out portion in the direction of the rotational element. The front edge can then be additionally secured to the rotational element by suction air, as described above.

BRIEF DESCRIPTION OF THE DRAWINGS

An example of the invention is illustrated in the drawings and described below. In said drawing, in purely schematic views.

DETAILED DESCRIPTION OF EMBODIMENTS

Figure 1:
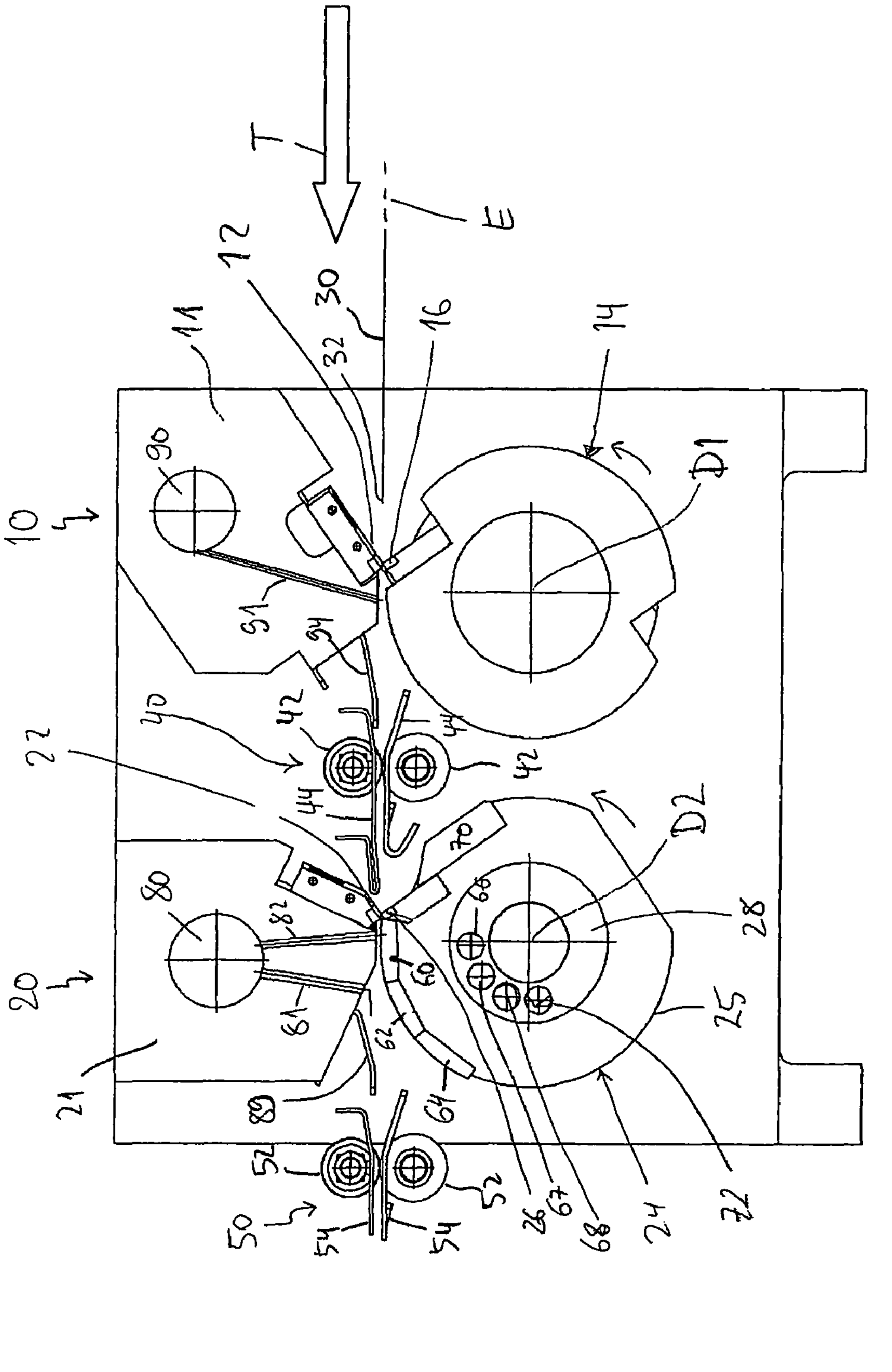
FIG. 1 shows a cross cutting device according to the invention in an overview.
Figure 18:
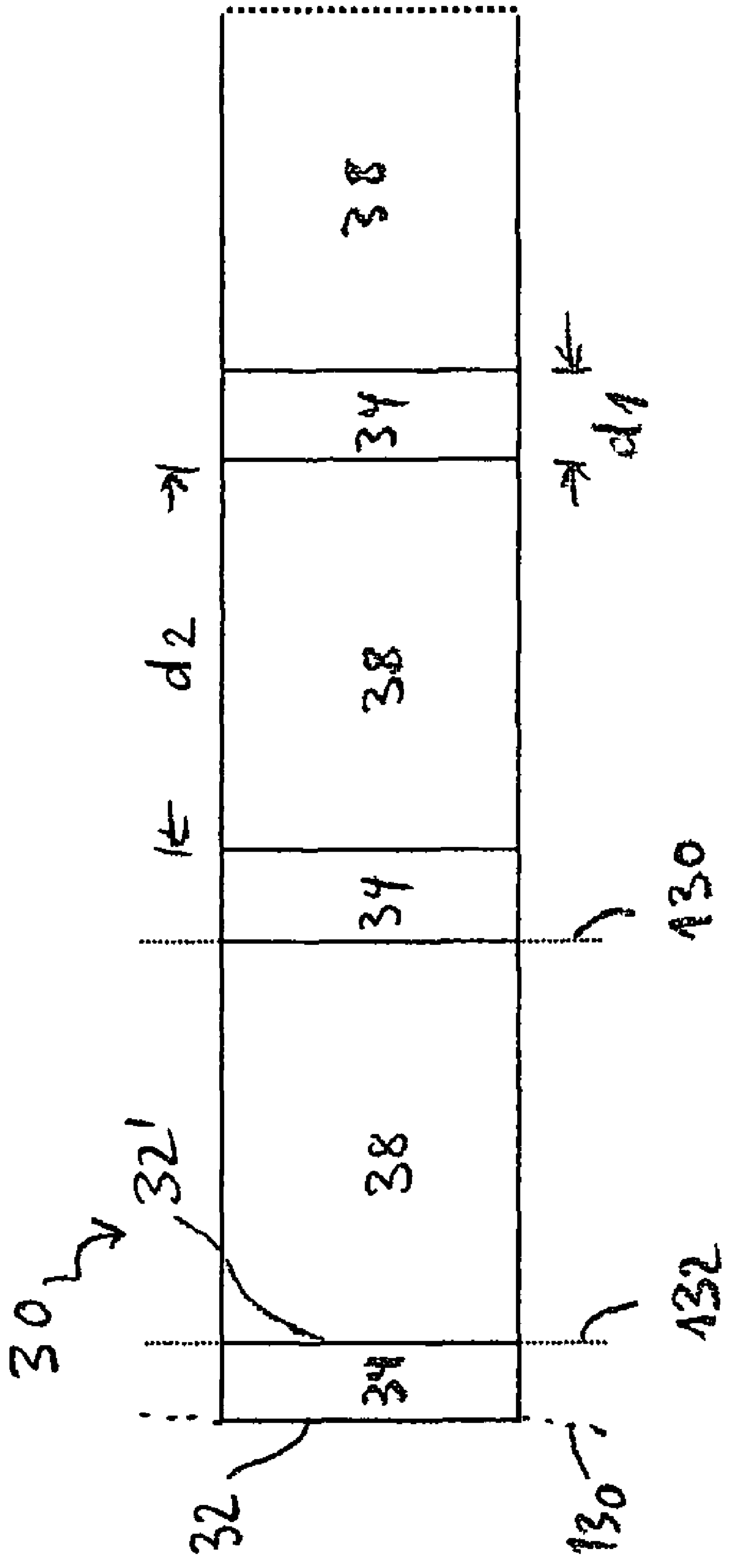
FIG. 18 shows the position of the cut-out portions and of the products in a flat material web.

FIG. 1 shows a cross cutting device according to the invention in an overview. It is composed of two cross cutting units 10, 20 which are arranged one behind the other in the direction T of transportation. The objective according to FIG. 18 is to separate a flat material web 30 into individual products 38 with a length d2 and cut-out portions 34 with a length d1 by producing separating cuts 130, 132 transversely with respect to the direction T of transportation with the cross cutting units 10, 20.

The cross cutting units 10, 20 each have stationary blades 12, 22 which are arranged in a first or second stationary blade block 11, 21 above the plane E of transportation. The material web is moved in the direction T of transportation with a material web transportation means (not shown here). Underneath the plane E of transportation of the material web 30 there are preferably cylindrical first or second rotational elements 14, 24 which can be rotated about a rotational axis D1, D2 which is oriented parallel to the plane of transportation and transversely with respect to the direction T of transportation, and each have a blade 16, 26 which is permanently attached to the rotational element 14, 24 and therefore rotates with it. As a result of rotation of the rotational element 14, 24, the rotating blades 16, 26 are moved past the stationary blades 12, 22. The stationary and rotating blades 12/16, 22/26 of a cross cutting unit 10, 20 are preferably arranged in a slightly staggered fashion with respect to one another so that point contact which migrates transversely with respect to the direction of transportation, and therefore a precise cut, are brought about here.

In the present case, both rotational elements 14, 24 are arranged underneath the plane E of transportation. As a result, the blade position can be set satisfactorily, the device can be satisfactorily serviced and the cut-out portion 34 to be produced can easily be carried downward. Other arrangements, for example both rotational elements 14, 24 at the top or one at the bottom and one at the top, are likewise possible.

The two rotational elements 14, 24 are preferably actuated and driven by two independent servo drives (not illustrated here). In order to cut with precise register, register marks on the material web 30 are generally used. The inputting of the desired lengths d1, d2 of the cut-out portion 34 and of the product 38 in a control unit (not shown here) allows the rotational elements 14, 24 to be correctly positioned automatically. The drive of the first cross cutting device 10 or of the first rotational element 14 reacts with positive or negative accelerations to changes in the distances between the register marks. The drive of the second cross cutting device 20 or of the second rotational element 24 follows said accelerations in a corresponding way.

The first cross cutting unit 10 is of an essentially conventional design. Differences from the prior art are the stationary blade block 11 in a blown air system, further details on which blade block 11 are given below.

The second cross cutting unit 20 has, in the second rotational element 24, three suction air zones 60, 62, 64 to which suction air can be applied individually or in combination, i.e. can be connected individually or in combination at specific times during the processing cycle to a vacuum or suction air source (not shown here). The suction air zones 60, 62, 64 are arranged on the circumferential face 25 of the second rotational element 24, a first suction air zone 60 being arranged directly in front of the rotating blade 26 in the direction of rotation (here in the counterclockwise direction), and the further suction air zones 62, 64 being located in front of it in the direction of rotation. The three suction air zones 60, 62, 64 take up in total approximately a quarter of the circumferential face of the second rotational element 24 and each extend over an arc corresponding to an angle of approximately 30°. Depending on the length of the cut-out portions 34 to be separated, it is possible also to provide fewer or more and/or shorter or longer suction air zones 60, 62, 64. Here there is no subdivision transversely with respect to the direction of transportation but it is possible to provide one in order to also adapt the system to material webs of different widths.

A blown air zone 70 is located at a small angular distance of approximately 10-30° behind the rotating blade 26 in the direction of rotation. Said blown air zone 70 has here a length corresponding to an angle of approximately 60°.

Each of the zones 60, 62, 64, 70 is assigned in each case a chamber (not illustrated here) in the interior of the second rotational element 24, said chamber being connected to in each case one entry 66, 67, 68, 72. The chambers are each covered with an air-permeable cover element which forms in each case one zone 60, 62, 64, 70. The cover element is, for example, a plate with bores or preferably an air-permeable, porous aluminum element. The latter provides a particularly homogeneous suction effect. The entries 66, 67, 68, 72 are arranged in the end face 28 of the second rotational element 24 and therefore rotate with the rotational element 24. They can be closed or opened individually or in combination by a control cam 112, which also makes the rotating movement. Since the entries 66, 67, 68, 72 are moved past the fixed connecting element 120, arranged in the region of the rotational axis D2, for suction air and blown air, the chambers and the assigned zones 60, 62, 64, 70 each have suction air or blown air applied to them depending on the position of the rotational element 24. The selection of the zones and their function during a processing cycle is described in more detail below in conjunction with FIGS. 11-13. It is to be noted here that blown air can also be output via the suction zones 60, 62, 64, and suction air can also be output via the blown air zone 70, which effect is preferably used in a selective fashion. However, the designation of the zones has been selected with reference to their main function.

Downstream of the cross cutting units 10, 20 in the direction T of transportation there is in each case a transportation system 40 or 50. Both transportation systems 40, 50 are of similar design and have at least one pair of driven transportation rollers 42 and 52 as well as upper and lower guide elements 44 and 54. The transportation systems 40, 50 preferably have a drive which is independent of the material web drive (not illustrated here) with which the material web 30 is fed to the cross cutting device. The material web or a product running in front can thus preferably be accelerated with respect to the material web 30 running behind after a first separating cut 130 has been carried out by forming a gap 36.

The guide elements 44, 54 move the approaching front edge 32 of the material web 30 or of a product 38 into the region of the transportation rollers 42, 52. This function is supported by blown air systems in the stationary blade blocks 11, 21. As is illustrated in more detail in FIGS. 2-9, the stationary blade blocks 11, 21 each have at least one blown air duct 81, 91 which runs in the region of the plane E of transportation and parallel thereto. The air is fed to the second or first cross cutting unit 20, 10 at an entry 80, 90 at the blade block 22, 11 and directed out via the blown air duct 81, 91 which runs essentially perpendicularly but is bent in the region of the plane E of transportation. An impact plate 89 or 94 serves to guide the air on parallel to the plane E of transportation. If the material web 30 or the product is below the impact plate 89, 94, the flow cross section which is available to the air is reduced, the air is correspondingly accelerated and the pressure reduced (Venturi effect). As a result of the partial vacuum which is generated, the material web 30 or the product is easily drawn upward and transported forward with the air stream. This facilitates the introduction between the transportation rollers 42, 52 of the transportation systems 40, 50.

However, in the second cross cutting unit 20 only the front edge 32 of the product 38 is to be moved onward in the direction T of transportation. The front edge of the cut-out portion 34 is to be moved off downward through the rotational element 24. In order to support this, the second blade block 21 has a second blown air duct 82 which can also be connected to the entry 80 and points essentially perpendicularly onto the plane E of transportation. The blown air is alternately fed to the ducts 81 and 82, the front edge and the part of the material web 30 which follows it being correspondingly deflected upward or downward. The mechanism for adjusting the air stream is described in more detail below with reference to FIGS. 14-17.

At least in the second cross cutting unit 20, in each case a plurality of first ("Venturi") or second ducts 81, 82 are preferably provided transversely with respect to the direction T of transportation, said ducts 81, 82 alternating with one another, each opening along a line transverse with respect to the direction of transportation and each forming a blown air strip, which is explained in more detail with respect to FIGS. 14-17.

FIGS. 2-9 show the cross cutting device from FIG. 1 at various times during the setting up or within a processing cycle.

Figure 2:
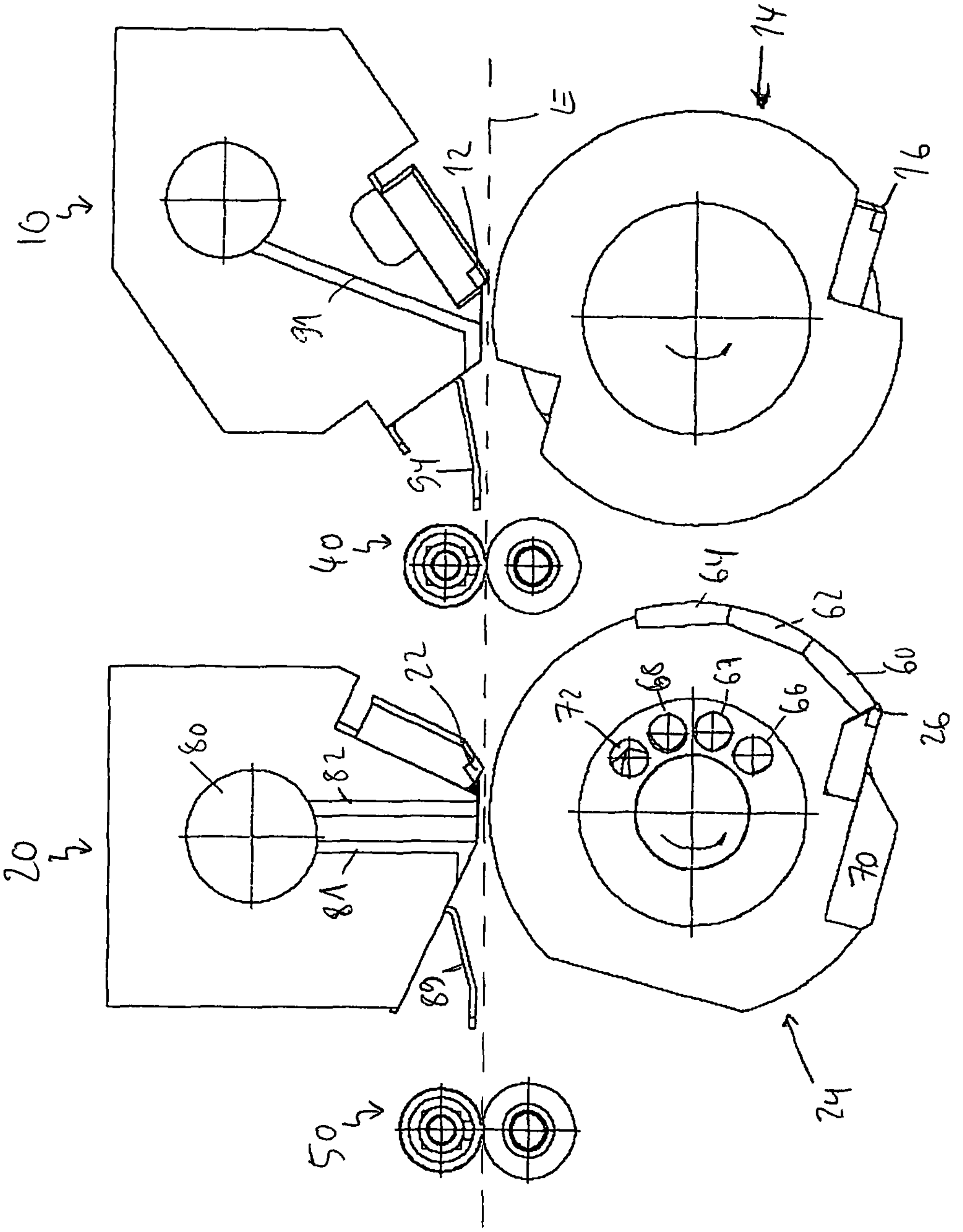
FIGS. 2-9 show the cross cutting device from FIG. 1 at various times during the setting up or within a processing cycle.
Figure 3:
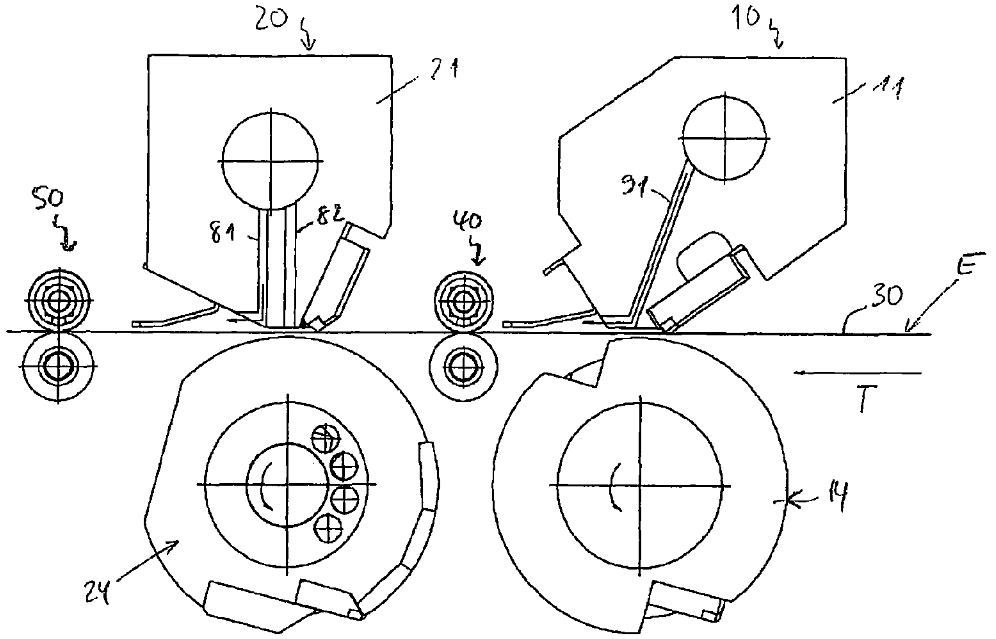

FIG. 2 shows the cross cutting device at the start of the setting up without a material web 30. The rotational elements 14, 24 are in a defined basic position which corresponds here to a position in which the rotating blades 16, 26 are removed from the cutting position by approximately one half rotation. Format-related data, in particular the length of the product with or without a cut-out portion, the length of the cut-out portion (if one is to be produced), optional paper thickness, is input into the control unit. If a cut-out portion is not to be produced, the second rotational element 24 is automatically moved into a neutral position and deactivated.

In the next step (shown in FIG. 3), the material web 30 is pushed in in the direction T of transportation in the plane E of transportation. Blown air is applied to the blown air ducts 81, 91 in the stationary blade blocks 11, 21. By using the Venturi effect it is possible easily to introduce the material web 30 into the first or second transportation system 40, 50. The material web 30 is drawn in behind the second transportation system 50.

Figure 4:
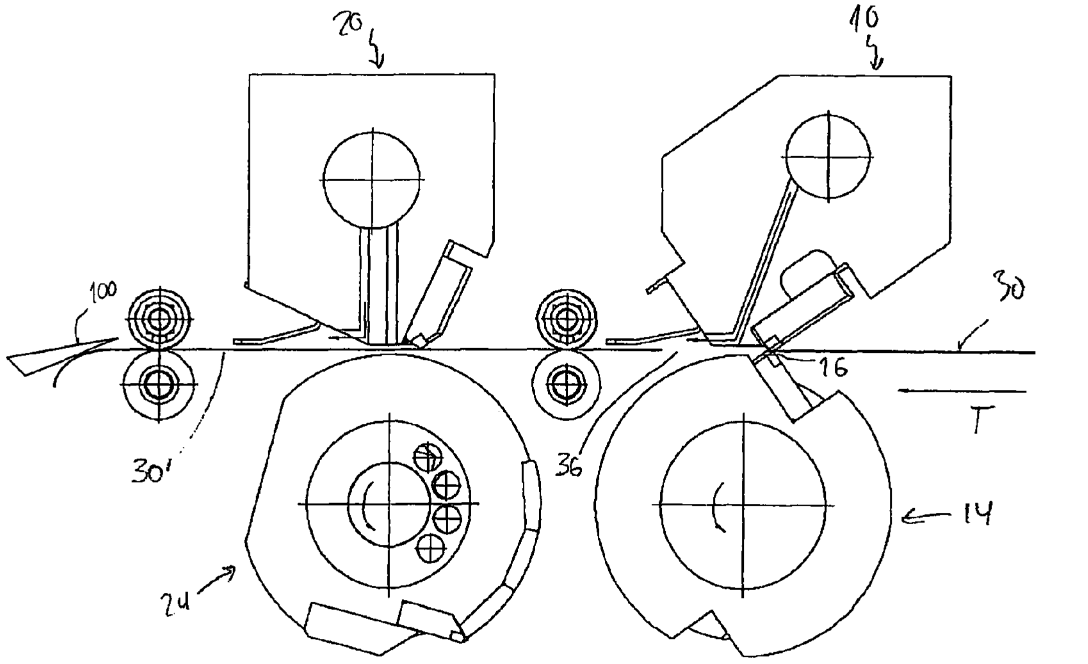

In the next step which is shown in FIG. 4, the first cross cutting unit 10 makes a cut by moving the first rotational element 14 out of the basic position into the cutting position which is shown there and in which the cutter of the rotating blade 16 is in the plane E of transportation. The initial cut sheet 30' is output with the second transportation system 50 via a reject diverter 100. Since the transportation rollers 42, 52 run approximately 10% more quickly than the transportation of the material web, a gap 36 is produced.

Figure 5:
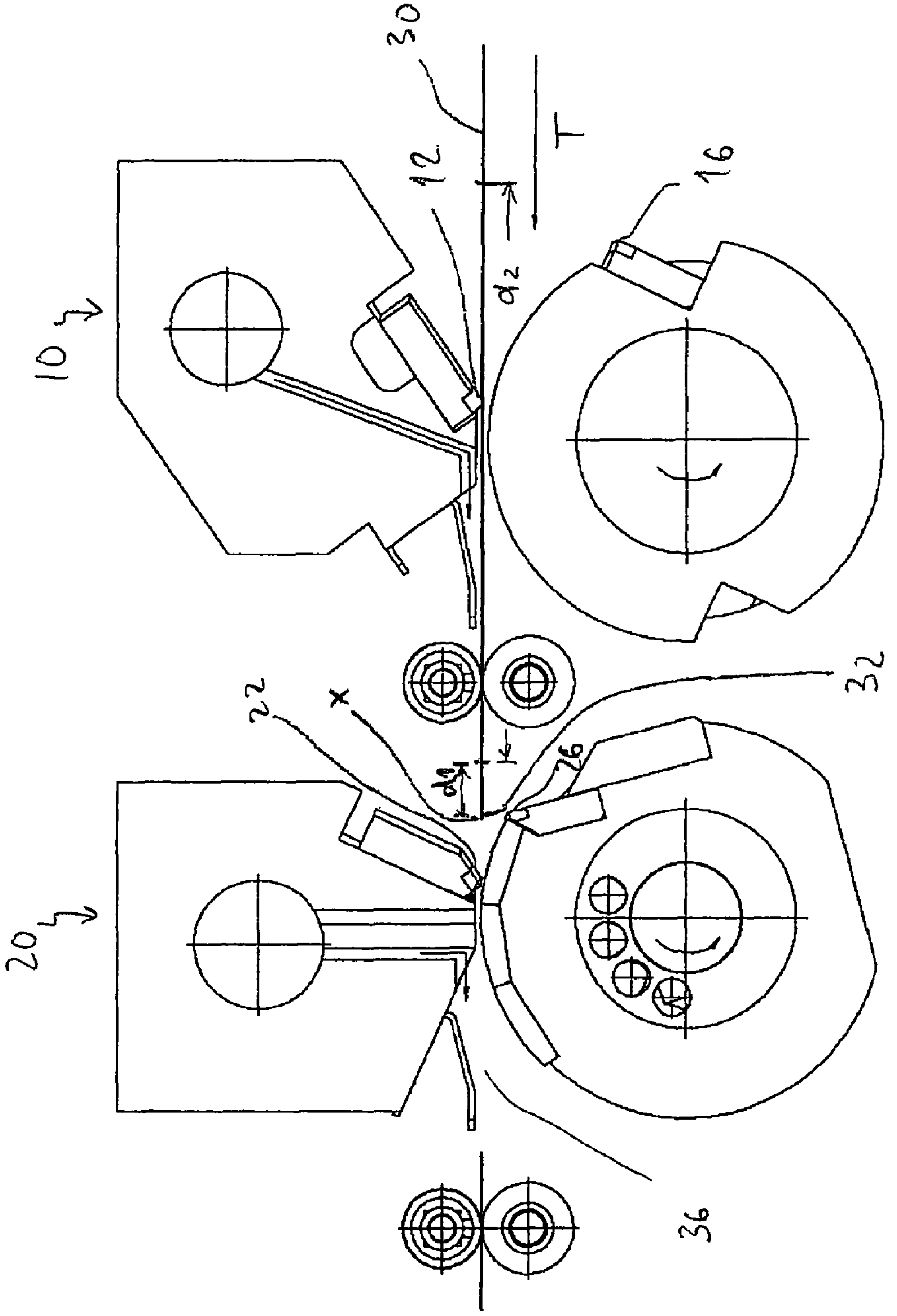
Figure 6:
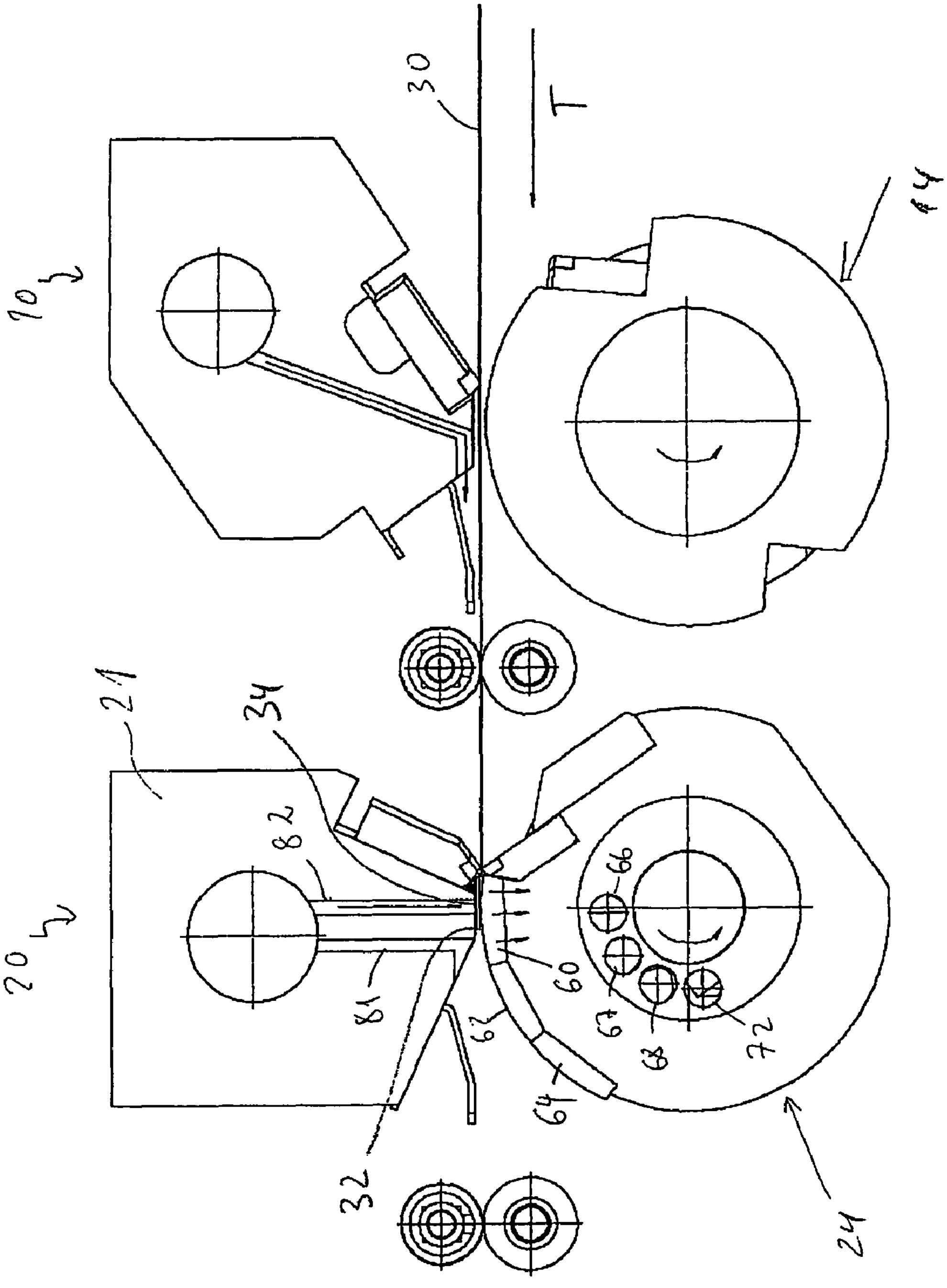

In the next step shown in FIG. 5, the front edge 32 is moved into a defined position X, for example monitored by a sensor, at a defined distance in front of the second stationary blade 26 and stopped there. The distance is, for example, approximately 10 mm. The rotational elements 14, 24 are moved into their start positions shown in FIG. 5. The start position is determined by the control unit on the basis of the input lengths d1, d2 of the cut-out portion 34 and the product 38 to be produced. In the start positions, the cutters of the rotating blades 16, 26 are at such an angular distance from the corresponding stationary blades 12, 22 that when the material web 30 and the rotational elements 14, 24 start up simultaneously, on the one hand a second separating cut 132 is produced by the second blade pair 22/26 at a distance d1 from the front edge 32, and on the other hand the first blade pair 12/16 produces a first separating cut 130 at a distance d2 from the second separating cut 132 or the front edge of the product 38 (see FIG. 18).

If format lengths of the order of magnitude of the circumferential length of the rotational elements 14, 24, or more, are to be manufactured given a material web 30 which is transported at a constant speed, one or both rotational elements 14, 24 can be driven asynchronously with a variable speed. After the cut, the corresponding rotational element is braked again to such an extent that the desired format length runs through before a further separating cut is made.

Depending on the length d1 of the cut-out portion 34, one, two or three of the suction zones 60, 62, 64 or the corresponding entries 66, 67, 68 are cleared by the control device so that, depending on the position of the second rotational element 24, it is possible to apply suction air to them. The clearing of the suction zones 60, 62, 64 can be carried out automatically by means of the control unit or manually, and is described in more detail below with reference to FIGS. 10-13.

After the step shown in FIG. 5, the setting up is terminated and the cross cutting device can be started for the continuous or clocked normal operating mode.

FIGS. 6-9 show the sequence of a processing cycle. After the start, the transportation of the material web and the drives of the rotational elements 14, 24 are high synchronously. As a result, the material web 30 is transported forward to such an extent that it is cut at a distance d1 from the front edge 32 and the desired cut-out portion 34 of the length d1 is produced. Just before this separating cut 132, suction air is applied to the first suction zone 60. If cut-out portions 34 with a relatively large length are to be manufactured, suction air is also applied to one or more of the adjacent suction zones 62, 64 before that. At the same time as suction air is applied to the suction chambers 60, 62, 64, the blown air in the second stationary blade block 21 is switched over in such a way that instead of flowing through the first duct 81, which is bent parallel to the plane E of transportation, it flows through the second duct 82 which points perpendicularly onto the plane E of transportation. As a result, the air jet presses the front edge 32 or the cut-out portion 34 additionally against the second rotational element 24. The separating cut 132 is carried out next.

Figure 7:
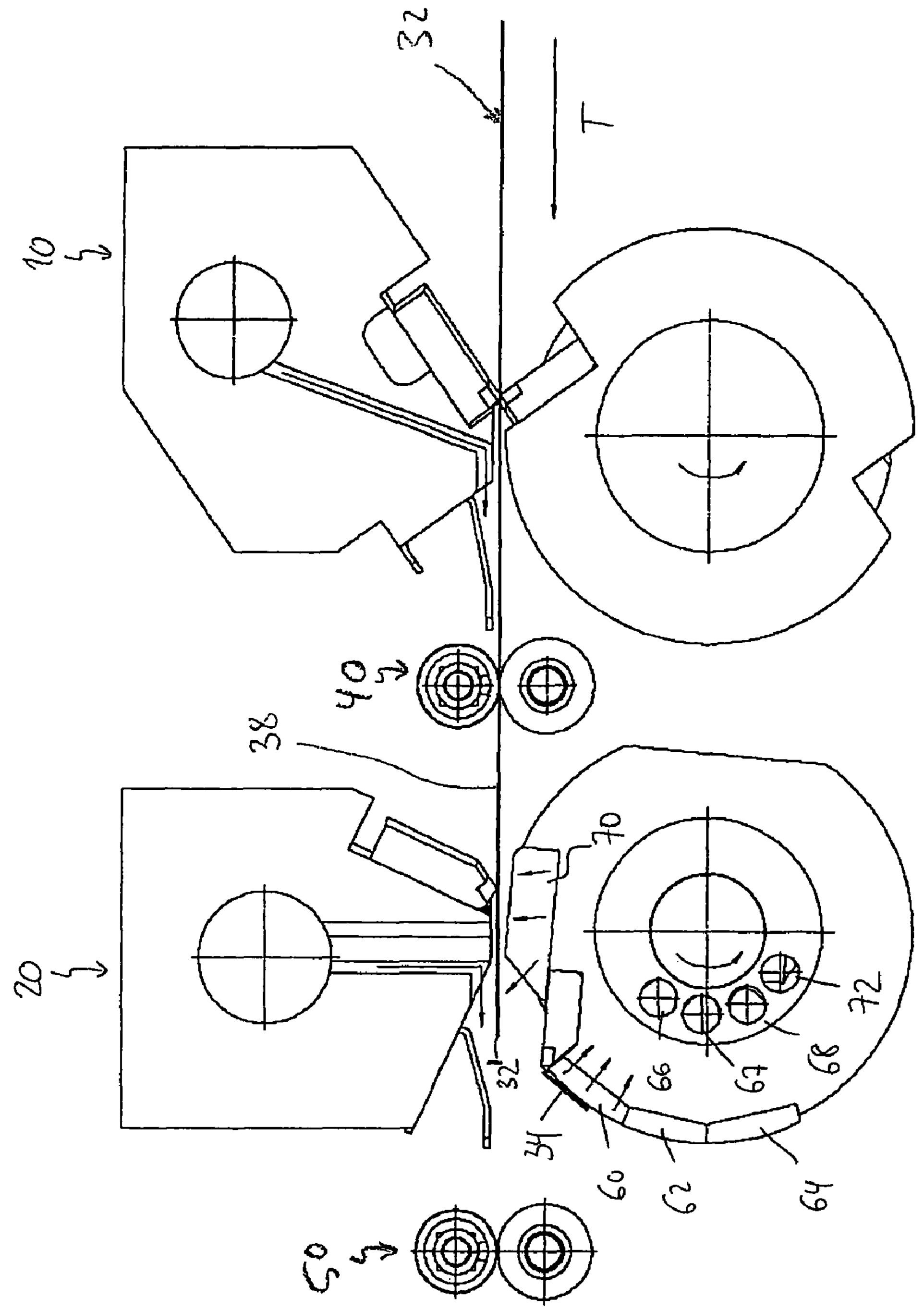

As FIG. 7 shows, the cut-out portion 34 is transported downward after the first separating cut by rotating the second rotational element 24, and in the process it is held by the vacuum. Just after the separating cut 123 which separates the cut-out portion, the blown air in the second stationary blade block 21 is directed again through the first (Venturi) duct 81. At the same time as the Venturi nozzles are switched on, the new front edge 32', produced after the separating cut 132, of the material sheet 30 is blown upward with additional blown air in the blown air zone 70 of the second rotational element 24. This ensures that the product to be manufactured is reliably transported to the second transportation system 50. The first rotational element 14 continues to rotate synchronously, and in the position shown in FIG. 7 it carries out the second separating cut at a distance d2 from the new front edge 32'.

Figure 8:
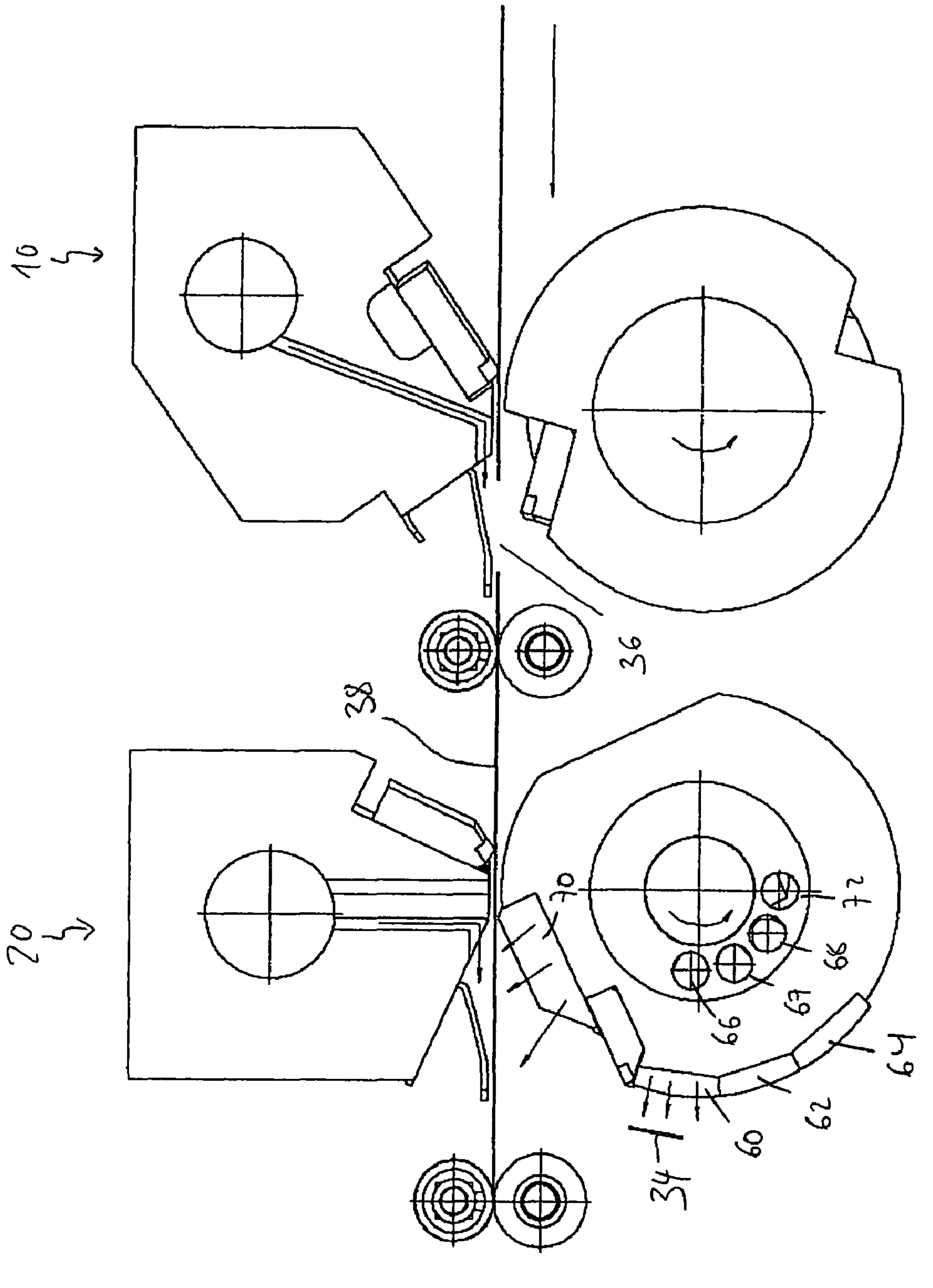
Figure 9:
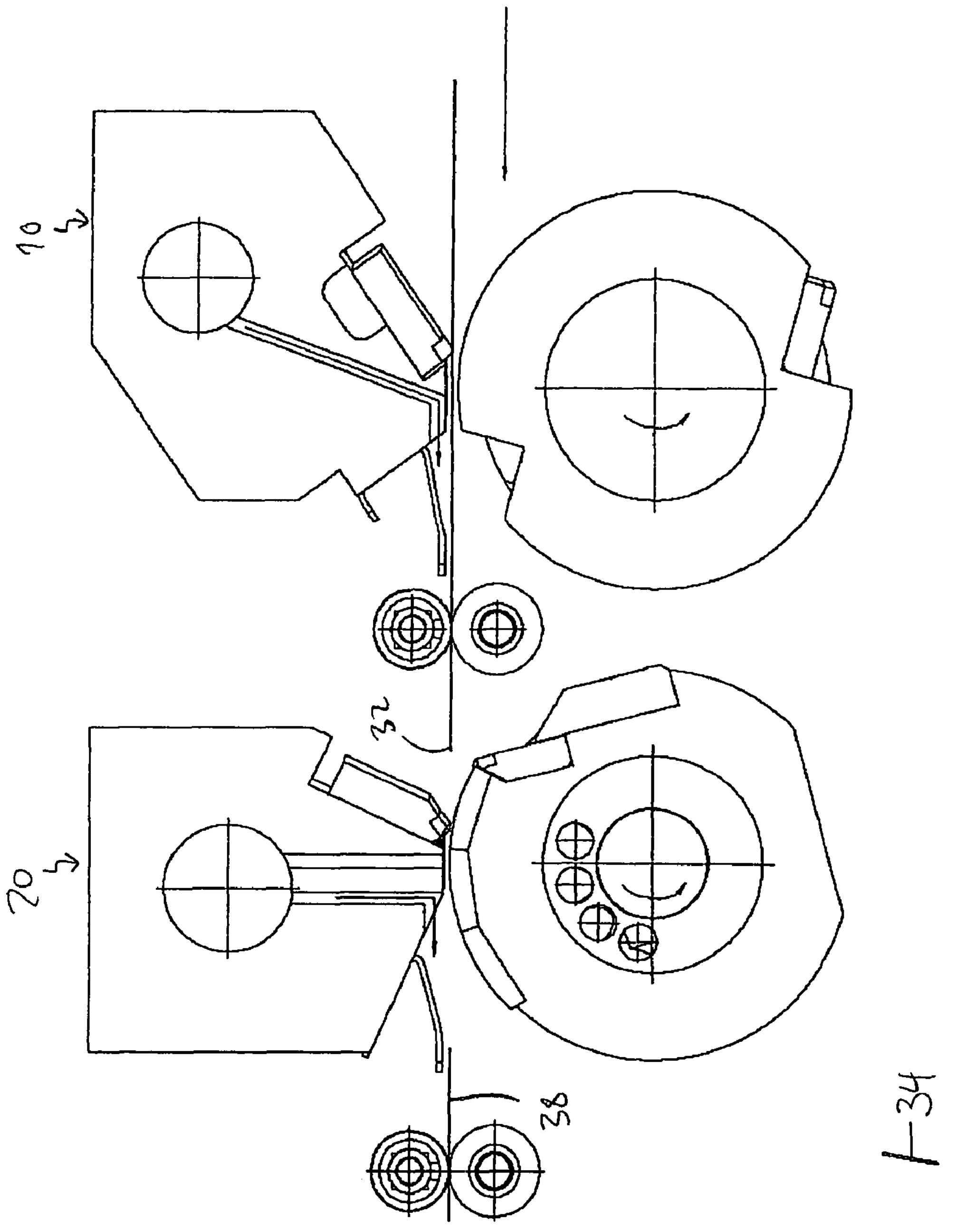

As is shown in FIG. 8, the finished product 38 is then transported out through the transportation systems 40, 50. As a result of the transportation rollers 42, 52 running faster than the web drive, a gap 36 is generated between the product 38 and the material web 32. Furthermore, the suction air in the first suction air zone 60 is switched off and switched over to blown air after the second rotational element 24 has rotated through approximately a further 90°. As a result, the cut-out portion 34 is blown away from the second rotational element 24 and can be removed, i.e. by suction or picking it up in a reject box.

A situation which corresponds essentially to FIG. 5 is produced by further rotation of the rotational elements 14, 24 and advancing of the material web 32, and the processing cycle is started again. The rotational elements 14, 24 can be driven here at a constant speed or else with unequal speed, in particular in order to manufacture larger formats than the circumferential length.

Figure 10:
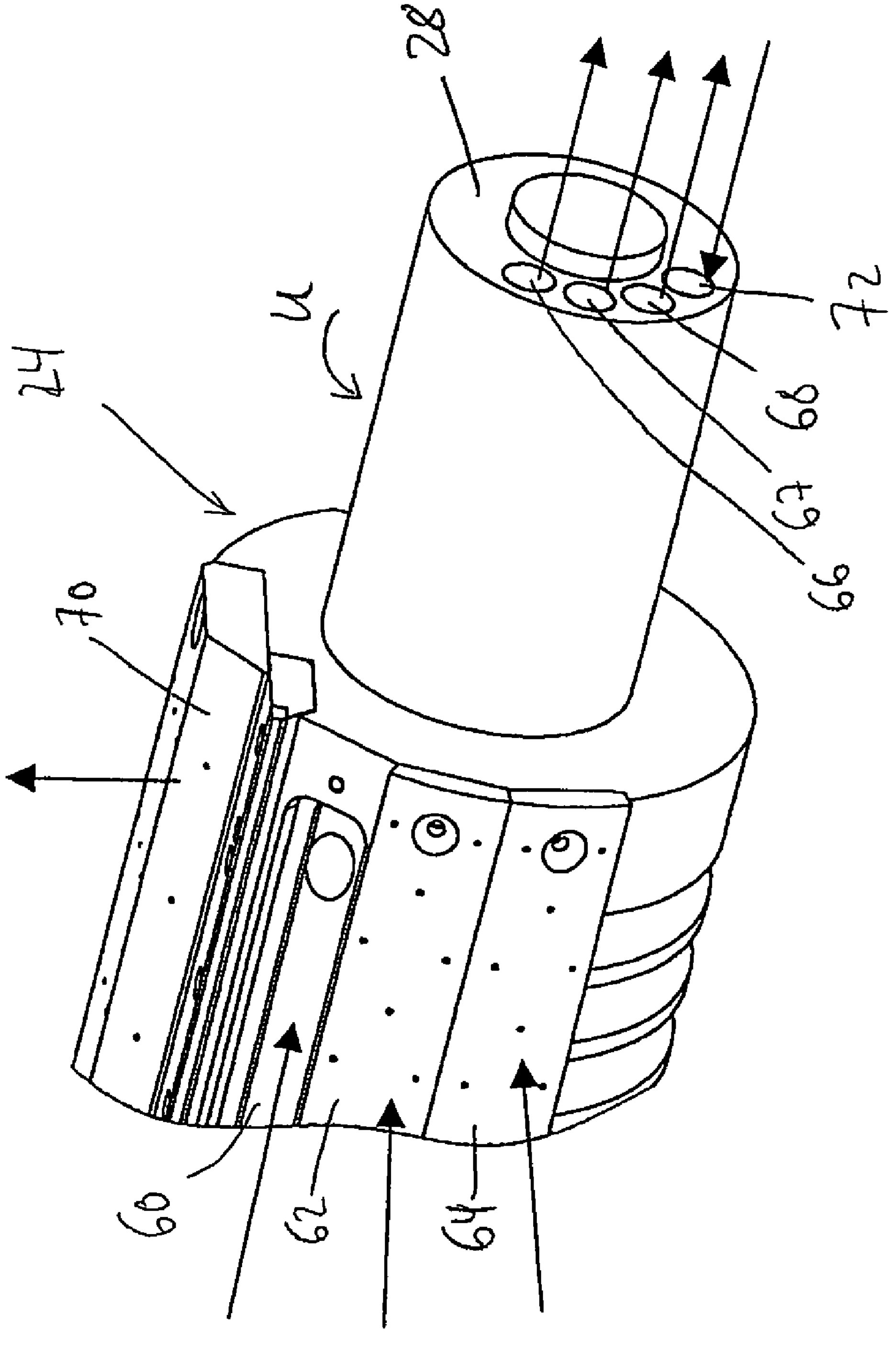
FIG. 10 shows a view of a detail of the second rotatable element with entries to the suction air zones or blown air zones.

FIGS. 10-13 show the control of the suction air supply and the blown air supply into the second rotatable element 24. FIG. 10 shows in this respect a detailed view of the second rotatable element 24 which has, on its circumferential face, the three suction air zones 60, 62, 64 described above and the blown air zone 70 which follows in the rotational direction U. The cylindrical rotational element 24 has a journal 29 at each of its ends (only one of which is illustrated), and it is also mounted on said journal 29. In the end face 28 of the rotational element 24 or of the journal 29 there are four bores which constitute entries 66, 67, 68, separated from one another, to the suction air zones 60, 62, 64 via the chambers, corresponding to them, or via an entry 72 to the blown air zone 70 via the chamber which corresponds to it. The entry 72 which lies at the front in the direction of rotation supplies the blown air zone 72 which lies at the rear in the direction of rotation. The entries 68, 67 and 66 which adjoin it in the direction of rotation correspond to the chambers 64, 62 and 60 in the same sequence.

Figure 11:
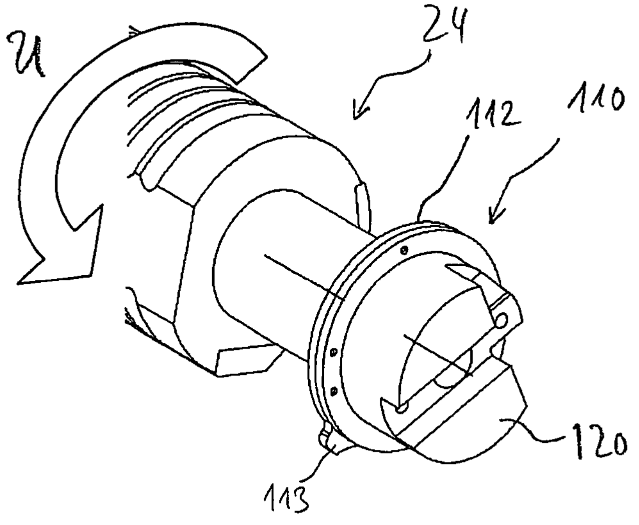
FIGS. 11-13 show a view of a detail of the second rotatable element with a control device and a connecting element for suction air and blown air.
Figure 12:
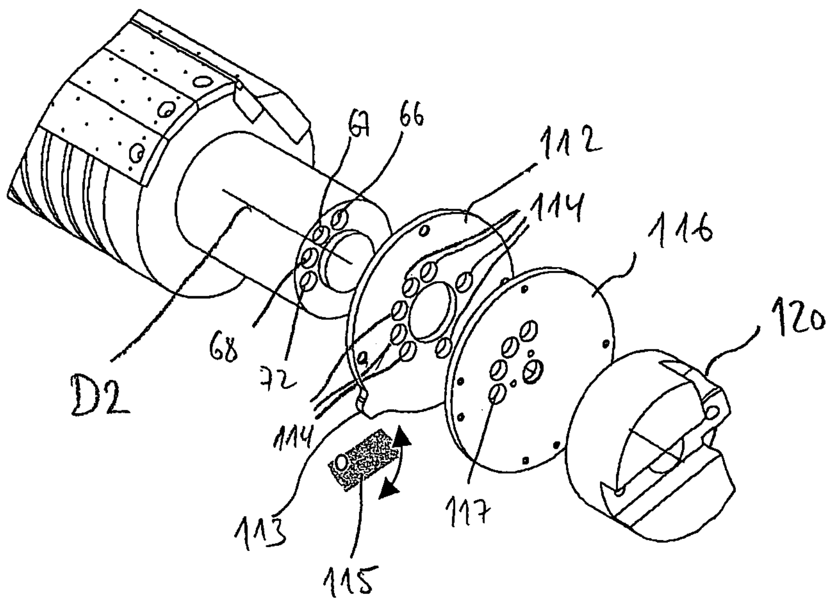
Figure 13:
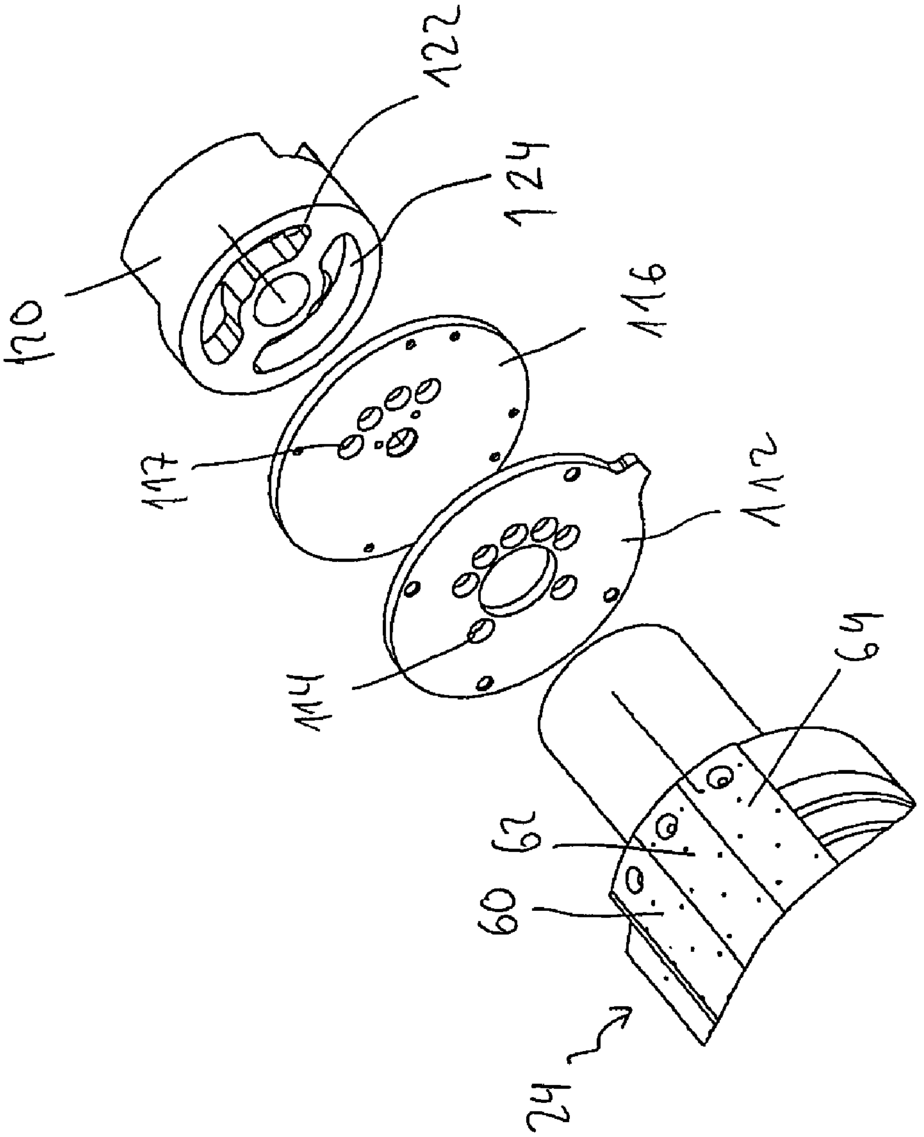
Figure 14:
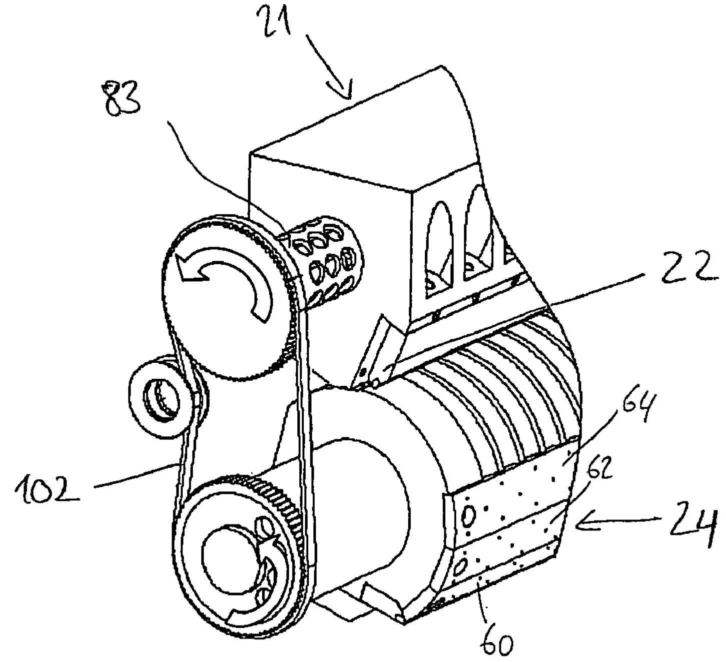
FIGS. 14-17 show views of a detail of the second cross cutting unit showing a mechanism for deflecting air in the region of the second stationary blade.
Figure 15:
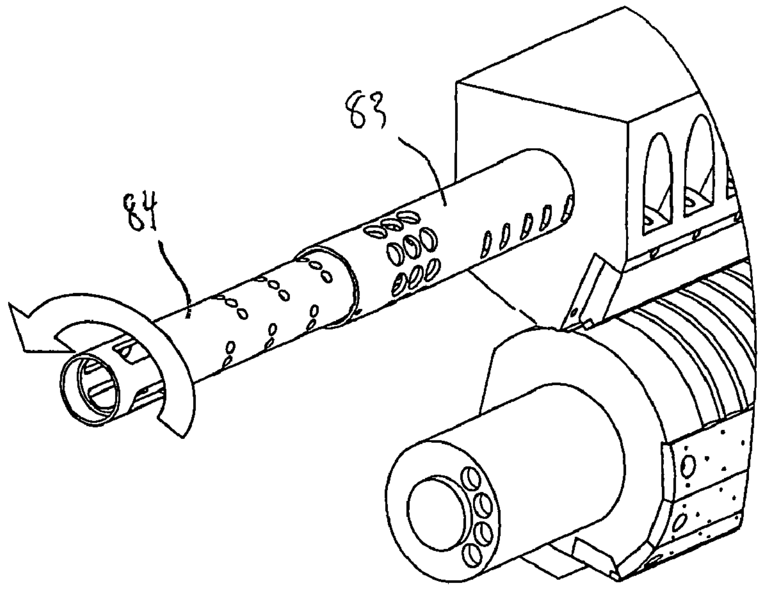
Figure 16:
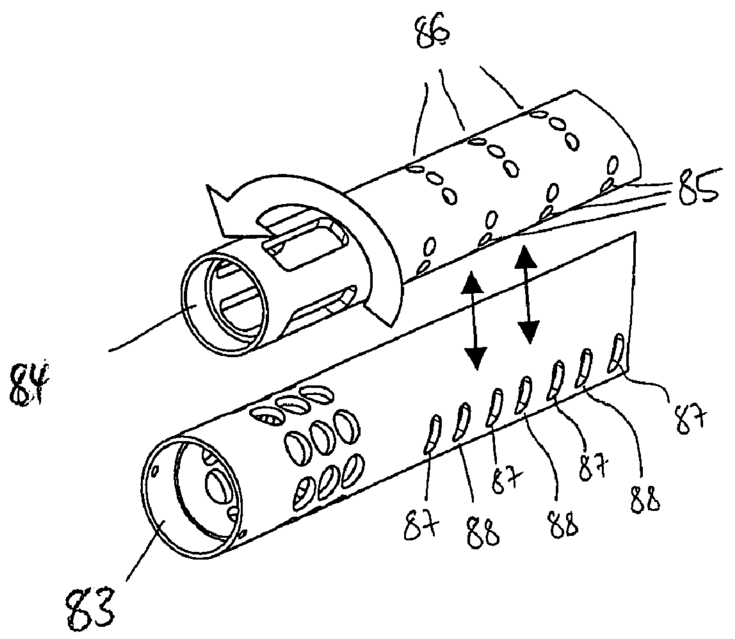

FIGS. 11-13 show the second rotational element 24 with the control device 110 which is attached thereto and has the purpose of adjusting the access to the suction air and the blown air entries 66, 67, 68, 72 as well as with a connecting element 120 for blown air and suction air in the assembled state (FIG. 11) or in an exploded drawing in two views (FIGS. 12 and 13). The control device 110 comprises a control cam 112 which is arranged coaxially and rotatably with respect to the rotational element 24 and which has seven continuous cutouts 114 here. These are approximately in the shape of the entries 66, 67, 68, 72 and are located at the same distance from the rotational axis D2. The cutouts 114 are arranged in such a way that depending on the relative position of the control cam 112 to the end face 28, in each case the blown air entry 72 and optionally one, two or three suction air entries 66, 67, 68 are cleared, while the other entries (if present) are closed. Together with a cover plate 116, which has four cutouts 117 corresponding to the suction and the blown air entries 66, 67, 68, 72, the control cam 110 is connected in a rotationally fixed fashion to the rotational element 24, for example with pressure elements.

During operation, the rotational element 24 including the control cam 110 and the cover plate 116 rotates past a fixed connecting element 120 for blown air and suction air. The connecting element 120 has two kidney-shaped milled elements 122, 124, the upper one of which has suction air/vacuum applied to it and the lower has blown air applied to it. The milled element 122 for suction air is located approximately above the horizontal and the milled element 124 for blown air is located below the horizontal. The position of the milled elements 122, 124 is matched to the position of the entries 66, 67, 68, 72 in such a way that suction air and the blown air are applied to the suction air and the blown air zones at the desired times within the processing cycle.

In order to switch the desired number of suction zones 60, 62, 64 on and off during the setting up process, the control cam 110 is rotated in relation to the rotational element 24, while the cover plate 116 remains fixed in relation to the rotational element 24. The control cam 110 preferably has latched positions which are defined with respect thereto. The control cam 110 can be adjusted manually but also automatically. Its position can preferably be changed during operation so that when format changes occur it is not necessary to stop and restart.

In order to carry out the adjustment automatically, the control cam 110 has a cam 113 in particular also on both cylinder shaft ends 29. A latch 115 can be moved under remote control into the orbit of the cam 113. The second rotational element 24 makes at least one rotation for the adjustment and moves into a defined basic position in which the control cam 110 is in a defined position. Further rotation of the rotational element 24 through a specific angle causes the control cam 110 to be adjusted and allows the desired combination of entries 66, 67, 68, 72 to be cleared or closed. After adjustment has been carried out, the latch 115 is removed from the orbit of the cam 113 so that there is no further adjustment of the entries during the normal operating mode.

FIGS. 14-17 show a mechanism for switching over between Venturi blown air and normal blown air in the region of the second stationary blade 22. A tube 83 which has air slits 87, 88 and does not make the same rotational movement is mounted in the stationary second blade block 21. Each second air slit 87 opens here into a first blown air duct 81 which runs parallel to the direction T of transportation in the region of the blade 21. The other air slits 88 open into a second blown air duct 82 which runs perpendicular to the direction T of transportation in the region of the blade 21.

A control tube 84 is rotatably mounted at both ends of the stationary tube 83 and connected to a toothed belt 102. The blown air is introduced here into the control tube 84 from both sides of the blade block 21 but it can also only come from one side. On its circumference the control tube 84 has groups of continuous bores 85, 86. These are at the same axial distance from one another as the air slits 87, 88. However, they are offset with respect to one another in the radial direction. The air slits 87 lead to the first blown air ducts 81 which are located one next to the other in the transverse direction. The air slits 88 lead to the second blown air ducts 82 which are located one next to the other in the transverse direction but are offset with respect to the first blown air ducts 81. The second blown air ducts 82 open in front of the first blown air ducts 81 in the direction of transportation. By rotating the control tube 84, either the bores 85 of the first group are made to overlap with the air slits 87, or the bores 86 of the second group are made to overlap with the air slits 88. As a result, depending on the position of the control tube 84, the Venturi blown air or normal blown air is switched on. The time of switching over can be matched in an optimum way to the time of the separating cut 132 by means of the 1:1 transmission ratio by virtue of the toothed belt 102.

Figure 17:
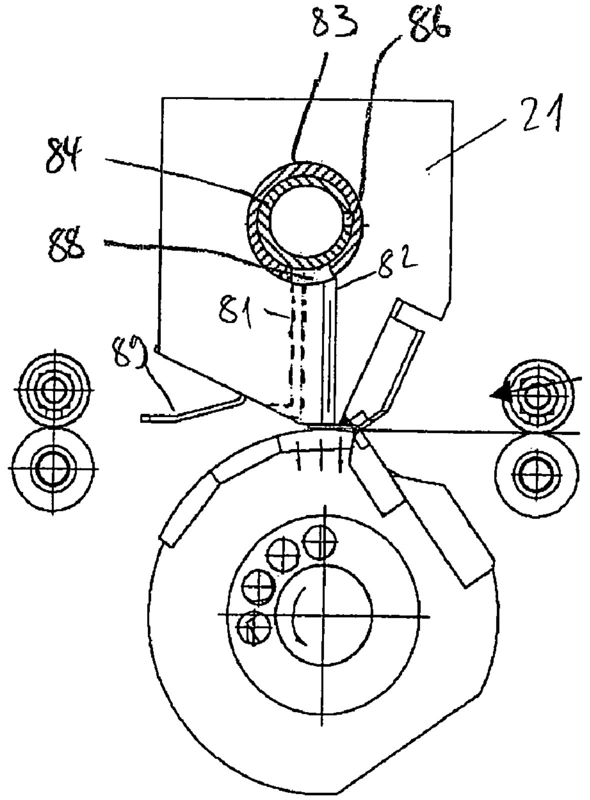

FIG. 17 shows by way of example how an air slit 88 in the stationary tube 83 is permanently connected to a second blown air duct 82, but only has blown air applied to it if the bore 86 of the control tube 84 is located in the region of the air slit 88. The first blown air duct 81 which is located behind or in front of the second blown air duct 82 in the transverse direction is indicated by dashed lines and is not supplied with blown air via the bore 86.

If a clocked Venturi controller is not required, manual adjustment can alternatively be provided. A control tube with corresponding air slits can be adjusted manually in such a way that the Venturi blown air strip or the normal blown air is switched on, or both are switched on together.

Although the invention has been described in detail and with reference to the specific embodiments thereof, it would be apparent to those skilled in the art that various changes, arrangements and modifications may be applied therein without departing from the spirit and scope of the invention.

What is claimed is:

1. A method for operating a cross cutting device for manufacturing cut-out portions from a flat material web that is moved in a direction of transportation, the cross cutting device comprising:

a first cross cutting unit for the flat material web, said first cross cutting unit having a first fixed blade and a first rotating blade arranged on a first rotational element; and a second cross cutting unit for the flat material web, said second cross cutting unit being spaced apart from said first cross cutting unit in the direction of transportation and having a second fixed blade and a second rotating blade arranged on a second rotational element, wherein:

the second rotational element can be connected to a suction device such that a cut-out portion is at least temporarily secured on the second rotational element, and the second rotational element contains, along a circumferential face, a plurality of zones to which suction air can be applied individually and/or in combination in order to secure cut-out portions of different formats, the method comprising:

selecting the zones of the second rotational element in accordance with a format of the cut-out portion; and correspondingly clearing or interrupting entries to the zones, wherein:

blown air is applied to a region of the second fixed blade in such a way that the section is pressed against the second rotational element, and a direction of the blown air is changed in the region of the second fixed blade after a separation of the section, in such a way that the subsequent flat material web is drawn away from the second rotational element.

2. The method as claimed in claim 1, wherein suction air is applied to the selected zones at least until a section with the second cross cutting unit has been separated from the flat material web.

3. The method as claimed in claim 2, wherein blown air is applied to a further zone of the second rotational element after the section has been separated from the flat material web.

4. A cross cutting device for manufacturing cut-out portions from a flat material web that is moved in a direction of transportation, comprising:

a first cross cutting unit for the flat material web, said first cross cutting unit having a first fixed blade and a first rotating blade arranged on a first rotational element;

a second cross cutting unit for the flat material web, said second cross cutting unit being spaced apart from said first cross cutting unit in the direction of transportation and having a second fixed blade and a second rotating blade arranged on a second rotational element, wherein:

the second rotational element can be connected to a suction device such that a cut-out portion is at least temporarily secured on the second rotational element, the second rotational element contains, along a circumferential face, a plurality of zones to which suction air can be applied individually and/or in combination in order to secure cut-out portions of different formats, and an interior of the second rotational element contains a plurality of chambers that are separated from one another and that are continuously connected to one zone each, and whose connection to the suction device can be interrupted for at least some of the chambers; and a control device with which the connection of the zones to the suction device can be cleared or interrupted as a function of a format of the cut-out portion, wherein:

the control device contains a control element that is arranged between a connecting element for the suction device and entries to the zones, the control element being able to assume different positions relative to the entries and being shaped in such a way that, depending on a position of the control device, the control device clears or interrupts one or more entries, the entries are arranged on an end face of the second rotational element, in each case at a same distance from a rotational axis, and the control element comprises a control cam that can be rotated about a rotational axis and has a plurality of continuous cutouts that can be placed in congruence with some of the entries or all the entries.

5. The cross cutting device as claimed in claim 4, wherein the second rotational element has a further zone to which blown air is applied by a blower device.

6. The cross cutting device as claimed in claim 4, wherein the zones are located one behind the other in a rotational direction of the second rotational element.

7. The cross cutting device as claimed in claim 1, wherein the control device has means for automatically changing the position of the control element.

8. The cross cutting device as claimed in claim 4, wherein blown air can be applied to the second cross cutting unit in a region of the second fixed blade in such a way that the flat material web is blown at least temporarily to the second rotational element.

9. The cross cutting device as claimed in claim 8, wherein the blown air can be deflected in such a way that the blown air flows essentially parallel to the direction of transportation.

10. The cross cutting device as claimed in claim 9, wherein the second cross cutting unit has a first blown air duct, which opens downstream of the second fixed blade in the direction of transportation, and is capable of generating an air stream that is oriented essentially in the direction of transportation, and a second blown air duct which opens in the region of the second fixed blade and is capable of generating an air stream that is oriented essentially perpendicularly to the plane of transportation.

11. A cross cutting device for manufacturing cut-out portions from a flat material web that is moved in a direction of transportation, comprising:

a first cross cutting unit for the flat material web, said first cross cutting unit having a first fixed blade and a first rotating blade arranged on a first rotational element;

a second cross cutting unit for the flat material web, said second cross cutting unit being spaced apart from said first cross cutting unit in the direction of transportation and having a second fixed blade and a second rotating blade arranged on a second rotational element, wherein:

the second rotational element can be connected to a suction device such that a cut-out portion is at least temporarily secured on the second rotational element, the second rotational element contains, along a circumferential face, a plurality of zones to which suction air can be applied individually and/or in combination in order to secure cut-out portions of different formats, and an interior of the second rotational element contains a plurality of chambers that are separated from one another and that are continuously connected to one zone each, and whose connection to the suction device can be interrupted for at least some of the chambers; and a control device with which the connection of the zones to the suction device can be cleared or interrupted as a function of a format of the cut-out portion, wherein:

the control device contains a control element that is arranged between a connecting element for the suction device and entries to the zones, the control element being able to assume different positions relative to the entries and being shaped in such a way that, depending on a position of the control device, the control device clears or interrupts one or more entries, and the control device has means for automatically changing the position of the control element.

12. The cross cutting device as claimed in claim 11, wherein the second rotational element has a further zone to which blown air is applied by a blower device.

13. The cross cutting device as claimed in claim 11, wherein the zones are located one behind the other in a rotational direction of the second rotational element.

14. The cross cutting device as claimed in claim 11, wherein:

the entries are arranged on an end face of the second rotational element, in each case at a same distance from a rotational axis, and the control element comprises a control cam that can be rotated about a rotational axis and has a plurality of continuous cutouts that can be placed in congruence with some of the entries or all the entries.

15. The cross cutting device as claimed in claim 11, wherein blown air can be applied to the second cross cutting unit in a region of the second fixed blade in such a way that the flat material web is blown at least temporarily to the second rotational element.

16. The cross cutting device as claimed in claim 15, wherein the blown air can be deflected in such a way that the blown air flows essentially parallel to the direction of transportation.

17. The cross cutting device as claimed in claim 16, wherein the second cross cutting unit has a first blown air duct, which opens downstream of the second fixed blade in the direction of transportation, and is capable of generating an air stream that is oriented essentially in the direction of transportation, and a second blown air duct which opens in the region of the second fixed blade and is capable of generating an air stream that is oriented essentially perpendicularly to the plane of transportation.

* * * * *